Patented Oct. 2, 1951

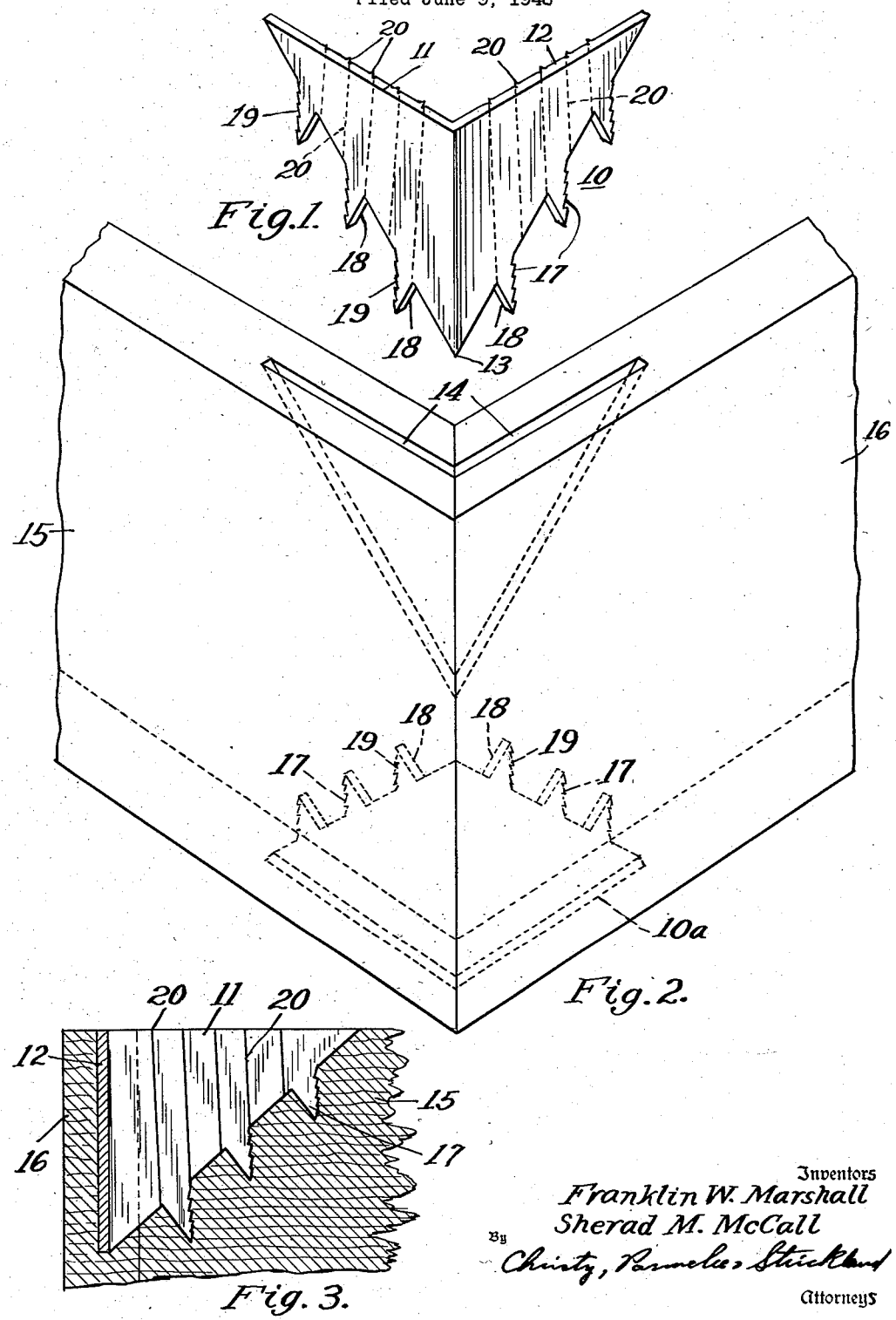

2,569,532

UNITED STATES PATENT OFFICE 2,569,532

JOINING DEVICE

Franklin W. Marshall, Pittsburgh, and Sherad M. McCall, Ross Township, Allegheny County, Pa.

Application June 9, 1948, Serial No. 31,980

6 Claims. (Cl. 85—11)

This invention relates to a tie or fastener for use by joiners and cabinet-makers for securing together pieces of wood meeting or intersecting at an angle, such as the sides of a drawer, box or the like, at the corners thereof.

The mortise-and-tenon joint usually employed in cabinet-making must be accurately made and fitted and is, therefore, rather costly. Unless the mortise and tenon are of dovetail shape, furthermore, the holding power is not very great even when the joint is glued, which is the usual practice.

We have invented a simple, inexpensive tie or fastener in the form of an angle plate which can readily be driven home by a hammer into slots or kerfs preformed or cut in the ends or other abutting portions of the members to be joined and will firmly anchor itself therein, thus providing a strong, tight, permanent joint, even without the use of glue. The plate has two or more wings and each wing has a plurality of tangs projecting angularly from the entering edge thereof. The tangs are toothed in order to increase their holding power. The inner surfaces of the wings are also provided with spaced inclined ridges or burrs generally normal to the upper edges forming the head of the fastener, which tend to pull together the pieces to be joined.

A complete understanding of the invention may be obtained from the following detailed description and explanation which refer to the accompanying drawings illustrating a present preferred embodiment. In the drawings:

Fig. 1 is a perspective view of our fastener;

Fig. 2 is a partial perspective view of two pieces meeting at right angle, such as the sides of a drawer, having the fastener of our invention applied thereto; and Fig. 3 is a partial section through one of the pieces taken in the plane of the inner face of one wing of the fastener.

Referring in detail to the drawings, our fastener indicated generally at 10, comprises a pair of triangular wings 11 and 12 having one side edge in common and forming a dihedral angle, usually 90°. The wings are of a right-triangular shape and are preferably made integral, although they may be formed separately and welded or otherwise joined along their common side edge. In either event, the hypotenuses of the wings form the entering edge of the fastener and meet at a common leading point 13. The remaining side edges together form the "head" of the fastener and receive the hammer blows by which it is driven. The fastener may be made of any suitable material, in any convenient manner. It is preferably composed of metal and may be cast or formed from flat stock by punching and bending.

The fastener 10 is adapted to be inserted in kerfs or slots 14 preformed in the ends or other abutting portions of wooden pieces such as those shown at 15 and 16 in Fig. 2, which are to be joined at an angle, e. g., the sides of a drawer, box, chest or the like. The slots or kerfs may be made by sawing or milling and are of the same shape and dimensions as the wings 11 and 12, so as to accommodate them snugly. The fastener is provided with tangs 17 spaced along the hypotenuses of the wings, which are adapted to be embedded in the bottoms of the slots or kerfs 14. If the latter are cut to the proper depth, the hypotenuses of the wings will bottom therein as the upper edges or "head" of the fastener become flush with the edges of the pieces 15 and 16. Fig. 2 shows a fastener 10a driven home in slots or kerfs cut in the lower edges of the pieces, and Fig. 3 clearly shows the positions of the various portions of the fastener relative to the pieces joined when driven home in the slots in the latter.

The tangs 17 have inclined edges 18 on the side thereof adjacent the corner or vertex of the fastener. When the fastener is driven home, these edges serve to pull the pieces 15 and 16 together by wedging or inclined-plane action as the tangs penetrate the wood. The other side of each tang has teeth 19 formed therein. The toothed sides slope downwardly away from the common side edge of the wings so that the teeth secure a firm grip in the fibers of the wood as they penetrate. As a result, the fastener becomes permanently united with the pieces it joins.

The inner faces of the wings have ridges or burrs 20 spaced therealong and extending from the upper edge to the hypotenuses of the wings. These ridges are sloped downwardly away from the corner or vertex of the fastener to a slight degree and become embedded in the fibers of the wood, thereby exerting a further force tending to draw together the abutting ends of the pieces 15 and 16 as the fastener is driven therein. The burrs or ridges 20 are formed on the inner surfaces of the triangular wings 11 and 12 in any suitable manner, as by scoring. These burrs project outwardly beyond the surfaces of the wings on which they are formed, and since the wings are adapted to have a snug fit in the kerfs 14, it will be seen that they will bite into the wood fibers as the fastener is driven in. Since they diverge in a downward direction with respect to the common edge of the wings ending in the point 13, it will further be seen that they will force the pieces 15 and 16 tightly together as they move downwardly in the slots 14.

The embodiment of the invention illustrated and described is adapted for joining members meeting at a corner. The invention may be readily embodied in other forms suitable for joining members meeting in a T, a cross, or simply abutting in end-to-end alinement. Such modifications affect merely the number of wings and the dihedral angle between them. The angle furthermore need not be 90° but may be of any other value, depending only on the angle between the members to be joined.

The joining device of our invention is obviously characterized by numerous advantages. The triangular shape of the wings provides a maximum of strength in the joint and makes the fastener simple to manufacture and apply, with a minimum rupture or distortion of the fibers of the pieces joined. The slots or kerfs for receiving the fastener are easy to cut by either a hand or power saw. The inclined edges of the tangs and the inclined ridges on the inner faces of the wings effect a strong pull tending to close the joint between the pieces. This is particularly useful in that it facilitates making glued joints without need of clamps. The tangs readily penetrate the wood at the bottoms of the slots or kerfs because their sides form an acute angle. The teeth on one side of each tang furnish a highly effective anchorage securing the fastener permanently in place when once driven home. The use of the fastener requires no special skill and it may, therefore, be employed by amateur craftsmen as well as skilled artisans. The cost of the fastener is low since it is made from inexpensive material by quantity production methods.

Although we have disclosed only one preferred embodiment of the invention, it may be readily embodied in forms other than that shown without departing from the spirit of the invention or the scope of the appended claims.

We claim:

1. A fastener adapted to be inserted in slots formed in the abutting portions of pieces to be joined, comprising a pair of plane right-triangular wings having one side edge in common, the hypotenuses of said wings each having a plurality of tangs spaced therealong adapted to penetrate the material of said pieces at the bottoms of the slots when the fastener is driven home therein, the edges of the tangs adjacent said common edge sloping downwardly away from the latter whereby to exert a wedging action tending to draw said pieces together as the tangs penetrate, the edges of said tangs remote from said common edge each having a slope which is ineffective to interfere with said wedging action.

2. A fastener adapted to be inserted in slots formed in the abutting portions of pieces to be joined, comprising a pair of plane right-triangular wings having one side edge in common, the hypotenuses of said wings each having a plurality of tangs spaced therealong adapted to penetrate the material of said pieces at the bottoms of the slots when the fastener is driven home therein, the edges of the tangs adjacent said common edge sloping downwardly away from the latter whereby to exert a wedging action tending to draw said pieces together as the tangs penetrate, the edges of said tangs remote from said common edge each having a slope which is ineffective to interfere with said wedging action, at least one edge of said tangs having teeth thereon for interlocking with the material penetrated to prevent withdrawal of the fastener.

3. A fastener as defined by claim 2 characterized by said toothed edge sloping downwardly away from said common edge, and being the tang edge remote from said common edge.

4. A fastener adapted to be inserted in slots formed in the abutting portions of pieces to be joined, comprising a pair of plane right-triangular wings having one side edge in common, the hypotenuses of said wings being adapted to bottom in the slots of the pieces to be joined when the fastener is driven to an operative fastening position in which another side edge of said wings is flush with an edge of the pieces in which the slots are formed, each of said hypotenuses having a plurality of tangs spaced therealong adapted to penetrate the material of the slots upon movement of the fastener to said operative fastening position, said tangs being triangular in shape and having one edge common with the hypotenuse to which it is connected and two penetrating edges diverging downwardly with respect to the common side edges of said wings.

5. A fastener as claimed in claim 4 characterized by the penetrating tang edges facing away from the wing common side edge diverging to a lesser degree than its other penetrating edge and having teeth formed thereon.

6. A fastener for connecting the abutting edges of wood pieces together comprising a nail formed of sheet metal for movement into slots formed in the abutting portions of said pieces and having triangularly-shaped wings connected together along a common side edge, each of said wings having one side edge in common, another side edge cooperating to form the head of said nail, and a sloping edge diverging upwardly from said common edge to form the hypotenuse of said wings, a plurality of triangularly-shaped tangs connected to said sloping edges, each of said tangs having penetrating edges diverging downwardly with respect to said common edge, said nail being movable to an operative fastening position in said slots with said common side edge at the point of connection of the pieces, said other side edges flush with an edge of the pieces being joined, said sloping edges respectively positioned at the bottom of one of said slots, and said tangs penetrating the material at the bottom of said slots, the diverging tang edges facing said common wing edge being effective to force the abutting edges of said pieces into tight engagement when the fastener is driven to an operative fastening position.

FRANKLIN W. MARSHALL.
SHERAD M. McCALL.

REFERENCES CITED

The following references are of record in the file of this patent:

UNITED STATES PATENTS

| Number | Name | Date |
| --- | --- | --- |
| 620,154 | Leighton | Feb. 28, 1899 |
| 2,398,603 | Soderberg | Apr. 16, 1946 |

FOREIGN PATENTS

| Number | Country | Date |
| --- | --- | --- |
| 224,605 | Switzerland | Mar. 1, 1943 |